United States Patent [19]

Santiso, III et al.

[11] Patent Number: 5,034,256

[45] Date of Patent: Jul. 23, 1991

[54] CLOSEOUT CONFIGURATION FOR HONEYCOMB CORE COMPOSITE SANDWICH PANELS

[75] Inventors: Joseph M. Santiso, III, Southbury; Stanley J. Durinski, Jr., Beacon Falls, both of Conn.

[73] Assignee: United Technologies Corporation, Hartford, Conn.

[21] Appl. No.: 399,676

[22] Filed: Aug. 28, 1989

[51] Int. Cl.[5] ............................................. B32B 3/12
[52] U.S. Cl. ...................... 428/73; 428/116; 428/117
[58] Field of Search .................. 428/73, 76, 116, 117, 428/118

[56] References Cited

U.S. PATENT DOCUMENTS

| | | | |
|---|---|---|---|
| 3,753,843 | 8/1973 | Hutchison | 428/73 X |
| 3,970,324 | 7/1976 | Howat | 428/73 X |
| 4,076,877 | 2/1978 | Tanzen | 428/73 |
| 4,335,174 | 6/1982 | Belko | 428/73 |

*Primary Examiner*—Henry F. Epstein

[57] ABSTRACT

This invention is directed to a high strength, lightweight honeycomb core composite sandwich panel. Typical composite sandwich panels comprise a honeycomb panel disposed between upper and lower composite panels. In this invention, a shim is disposed between the upper and lower composite panels around a portion of the periphery of the composite sandwich. The shim is disposed over an inner layer of foaming adhesive.

5 Claims, 1 Drawing Sheet

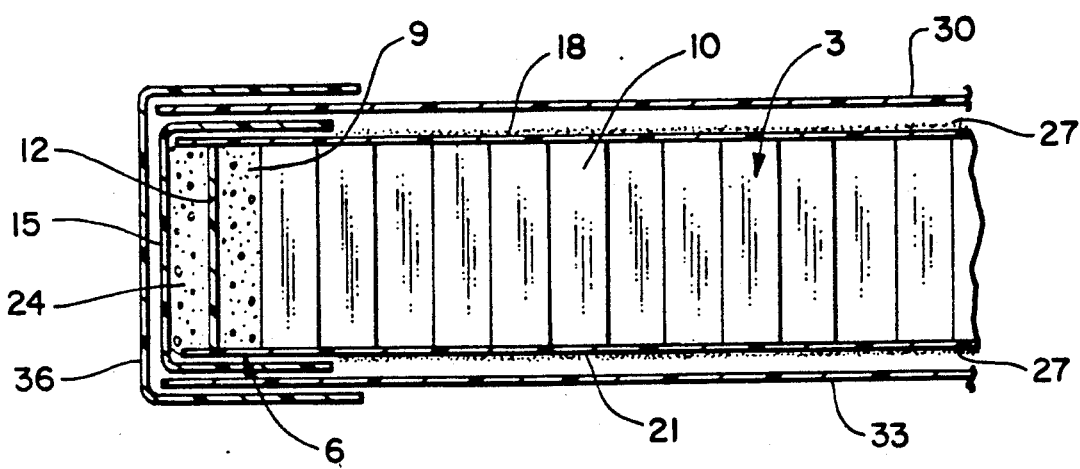

CLOSEOUT CONFIGURATION FOR HONEYCOMB CORE COMPOSITE SANDWICH PANELS

TECHNICAL FIELD

The field of art to which this invention pertains is composite structures, particularly honeycomb core composite sandwich composite structures.

BACKGROUND ART

Honeycomb core composite sandwich panels are commonly employed in the aerospace industry as they are extremely light weight yet have high strength. Honeycomb core composite sandwich panels are comprised of upper and lower fiber-reinforced composite laminates separated and stabilized by a core of honeycomb. Due to the high bending stiffness and compressive strength properties (e.g., the honeycomb serves as a shear web and separates the upper and lower composite laminates from the bending neutral axis) the panels are particularly useful for aircraft fuselage and cargo door structures.

Typically, the honeycomb core panels are fabricated in an open-faced mold while vacuum bagged and cured under pressure and temperature in an autoclave. Alternatively, these panels are often fabricated in a matched mold and/or press. In either case the lower laminates, honeycomb core and upper laminates are sequentially stacked in the mold. Film and/or paste adhesives are used between the upper and lower laminates and the honeycomb core. The upper and lower laminates may be uncured preimpregnated composite material, precured composite material or sheet metal skins. When laminated in an open-faced mold, the completed laminate is vacuum bagged and autoclave cured. Laminates in matched molds are cured in a press.

Typically, edge closeout laminates are interleaved between layers of the upper and lower laminates. However, this creates problems because the edge closeout does not receive adequate pressure to achieve a sufficient cure of the preimpregnated material. One solution has been to fill the core periphery with a syntactic filler or foaming adhesive which imparts rigidity to the panel edge. However, this solution adds substantial weight. In addition, the foam or filler creates an imperfect edge which subsequently impacts the quality and strength of closeout laminates since the foam or filler material is not machineable. Finally, if the compaction pressure applied to the panel edge during the cure cycle is not uniform, the edge laminates may become resin rich or resin starved.

U.S. Pat. Nos. 4,335,174 and 4,076,877 disclose two honeycomb core composite sandwich panel edge configurations. U.S. Pat. No. 4,335,174 discloses a foam adhesive in combination with a tape adhesive that is in conformance with the shape of the honeycomb core. The adhesives are disposed external to the upper and lower sandwich composite panels. U.S. Pat. No. 4,076,877 discloses an end closure for a honeycomb panel which is a two-layer or a laminate plastic ribbon. A first uncured layer is disposed adjacent to the honeycomb. A second precured layer is disposed external to the first layer and external to the composite panels that sandwich the honeycomb panel.

Thus, although there have been a variety of configurations for the edge of honeycomb core composite sandwich panels, there is still a continual search for lightweight, high strength, compaction resistant, composite panel edge configurations.

DISCLOSURE OF INVENTION

This invention is directed to a high strength, lightweight honeycomb core composite sandwich panel. Typical composite sandwich panels comprise a honeycomb panel disposed between upper and lower composite panels. In this invention, a shim is disposed between the upper and lower composite panels around a portion of the periphery of the composite sandwich. The shim is disposed over an inner layer of foaming adhesive.

The foregoing features and advantages of the present invention will become more apparent in light of the following detailed description of the best mode for carrying out the invention and in the accompanying drawings.

BRIEF DESCRIPTION OF THE DRAWINGS

The Figure illustrates a sectional view partly broken away of the honeycomb core composite sandwich panel of this invention illustrating the edge closeout configuration.

BEST MODE FOR CARRYING OUT THE INVENTION

A clear understanding of the invention may be had by reference to the Figure. In the Figure, a honeycomb panel 3 has upper and lower surfaces 18, 21. Typically, a film adhesive 27 is disposed on the upper surface 18 and lower surface 21 of the honeycomb core 3. The honeycomb panel 3 has an end section edge 6 which is stabilized with foaming adhesive 9. The edge section is typically nonuniform (e.g., comprises open and closed honeycomb cells) since the honeycomb was cut. Thus, this invention results in some of the honeycomb cells 10 being opened up from the side. A composite shim 12 having substantially the same height as the honeycomb core 3 extends around the periphery of the honeycomb panel 3 and is bonded to the honeycomb core 3 through a foaming adhesive 9. A first closeout laminate 15 extends around the periphery of the honeycomb panel 3 and overlaps the top and bottom surfaces 18, 21 of the honeycomb panel 3. The first closeout laminate 15 is bonded to the shim with foam adhesive 24. The first closeout laminate 15 extends inward from the edge along the upper surface 18 and lower surface 21 of the honeycomb core 3 a predetermined length sufficient to add the desired tensile strength in addition to closing out the edges. Upper composite panel 30 and lower composite panel 33 sandwich the honeycomb core 3 and overlap the first edge closeout laminate 15. A second edge closeout laminate 36 extends around the periphery of the sandwich panel and overlaps the upper composite panel 30 and lower composite panel 33. The second closeout laminate 36 extends inward from the edge along the upper panel 30 and lower panel 33 a predetermined length sufficient to add the desired tensile strength.

The honeycomb core 3 can be any metallic or nonmetallic honeycomb or flex core. The core used in panels typically varies in thickness ranging from about 0.125 inch to about 2 inches, however the described process can be applied to panels containing core thicknesses which are greater than 2 inches. The core is commonly made from aluminum alloy (5052, 2024, etc.) but may be made from other materials such as graphite, fiberglass, aramid fiber, polyimides and phenolics. The core cell dimensions typically range from about 0.125 inch to about 0.39 inch. Core densities typically range from about 1 lb/ft$^3$ to about 22 lb/ft$^3$ core. Preferably, the core density range is around 3 lb/ft$^3$. Compressive strengths of the core used in panels typically range from about 200 psi for normal density cores, (3 lb/ft$^3$ to 12 lb/ft$^3$). Higher density cores (approximately 22 lb/ft$^3$) yield much greater compressive strengths. Honeycomb cores are available from, for example, Hexcel Corporation (Bethel, Connecticut) and American Cyanamid (Wayne, N.J.).

The core is typically rigidized and/or stabilized using syntactic foam or expanding, foaming adhesives. The syntactic foam may be prefabricated into a desired shape and then bonded to the honeycomb core using a foaming adhesive or it may be impregnated into the core. The syntactic foam filler density range is typically between about 30 and about 50 lb/ft$^3$. EPOCAST (TM) syntactic foam filler is available from Furane Products, Los Angeles, California.

The composite panels 30 and 33 may be any of a variety of fiber-reinforced resin impregnated composite panels. The upper and lower panels may be fabricated as a composite laminated-type construction using various combinations of cloth layers pre-impregnated with resins. Resins are selected to achieve desired characteristics in the cured laminate; such as strength, environmental resistance to wet conditions or chemicals, and service temperature of the part. For example, 10 mil thick woven fiberglass cloth impregnated with a 350° F. cure epoxy resin system is available as E-293-FC (TM) from Ferro Corporation (Norwalk, Connecticut). KEVLAR (TM) prepreg (E.I. DuPont de Nemours, Delaware) is also available from American Cyanamid (Wayne, N.J.) in 10 mil thick layers impregnated with a 350° F. cure epoxy resin system. Graphite prepreg, available as 5225W-C-3000 (TM) 350° F. cure prepreg layers from Narmco Materials, Inc. (Anaheim, California) in a thickness of 7.5 or 15 mils, can also be utilized for high strength applications. Graphite prepreg may be strategically integrated between layers of fiberglass or KEVLAR (TM) fabric to achieve a composite laminate with various desired mechanical properties in selective areas.

The number of upper and lower composite panel plies and close-out plies, their shape and placement with respect to each other (e.g., curved) may vary to suit the application. Reinforcement materials may be added to the upper and lower panels to modify the physical properties of the resultant bonded panel. Various thicknesses of foam adhesives may be used in combination with film adhesive to obtain proper edge definition. The panel may also contain additional reinforcements commonly used in laminate fabrication (e.g., rigid foams, syntactic foams, metal inserts).

For example, sheet metal layers may be added to aid as a "riveting plate" or for electrical conductive or grounding purposes. Panel stiffness may also be enhanced by the usage of layers sandwiched in the laminate. These layers can be made from, for example, polyisocyanurate, cellular cellulose acetate or polyurethane and are available from General Plastics, Tacoma, Washington. The density of these materials is typically about 6 to about 8 lb/ft$^3$.

The closeout laminates 15 and 36 of this invention may be any of a variety of fiber reinforced resin impregnated composite materials as previous described for the composite panels 30 and 33.

In similar fashion, the shim 12 may be any of a variety of fiber reinforced resin impregnated composite panels such as those described for composite panels 30 and 33. In addition, the shim can also be thin sheet metal (e.g., aluminum, stainless steel).

A variety of foaming adhesives may be used to bond the shim to the honeycomb core and closeout laminates. Preferably the foaming adhesive is compatible with the prepregs, foams (expands) under heat, and expands uniformly. These adhesives typically expand or "foam" under the heat of the panels normal cure cycle up to 300% of their initial volume Their expanded density typically ranges from about 20 lb/ft$^3$ to 50 lb/ft$^3$. Their initial thickness ranges from 0.025 inches to about 0.1 inch but can be used in multiple layers. Two exemplary foaming adhesives are FM-410 (TM) adhesive and FM-37 (TM) expanding type adhesive available from American Cyanamid Company Other manufacturers are 3M Company, and McCann Manufacturing.

The honeycomb core composite sandwich panel and edge configuration of this invention may be made by a variety of processes. In general, the shim 12 is bonded to the honeycomb core 3 with the foaming adhesive 9 The first closeout laminate 15 upper and lower composite panels 30, 33 and second closeout laminate 36 are sequentially bonded to the honeycomb core panel, thus encapsulating the honeycomb core and shim.

However, the following process is preferable because a uniform, void-free, well defined edge closeout configuration is obtained The honeycomb core 3 is cut to the desired panel shape, however slightly undersized in comparison to the composite panels 30 and 33. A strip of foaming adhesive 9 is disposed around the periphery of the honeycomb core 3 so that all the voids resulting from the cutting of the honeycomb core 3 are filled by the foaming adhesive 9. A thin cured shim of composite material 12 is disposed over the strip of foaming adhesive and about the periphery of the honeycomb 3. The foaming adhesive 9 is cured using conventional curing conditions in order to bond the composite shim 12 to the honeycomb core 3. Closeout laminate 36, composite panel 33 and closeout laminate 15 are sequentially disposed in the mold so that the closeout laminates 36 and 15 sandwich the lower composite panel 33 and the closeout laminates 36 and 15 extend beyond the edges of the mold. The cured honeycomb core assembly is disposed within the cavity formed by the lower composite panel 33 and edge closeout laminates 15, 36 within the mold. (Open-faced molds are preferred. Match-molds also can be used. They don't have to be metal molds.) A small gap is left between the composite shim and the edge closeout laminates 15, 36. That gap is filled with uncured foaming adhesive 24. Upper composite panel 30 is placed over the honeycomb core assembly and interleaved with the edge closeout laminates 15, 36 so that the uncured foaming adhesive 24 is encapsulated. Finally, the mold is vacuum bagged and the composite honeycomb core panel is exposed to elevated temperatures and pressures (e.g., autoclave press cure) sufficient to fully cure the assembly. Typically, these temperatures and pressures are about 240° F. to 450° F. and about 10 psi to 100 psi.

This invention provides a substantially smooth and uniform edge closeout configuration through the use of a rigid composite shim disposed between the honeycomb core and the closeout laminates. The uncured foaming adhesives expand and react against the smooth rigid shim imparting uniformity and smoothness of pressure to the edge closeout laminates. Finally, this configuration reduces the overall weight by replacing syntactic foam with foaming adhesive and the use of a lightweight shim.

Although the invention has been shown and described with respect to detailed embodiments thereof, it should be understood by those skilled in the art that various changes in form and detail thereof may be made without departing from the spirit and the scope of the claimed invention.

We claim:

1. A honeycomb core composite sandwich panel comprising a honeycomb panel disposed between upper and lower composite panels wherein the improvement comprises a shim disposed between the upper and lower composite panels around at least a portion of the periphery of the composite sandwich, said shim being rigid and being disposed over an inner layer of cured foaming adhesive, said cured foaming adhesive being bonded to said honeycomb, an outer layer of cured foaming adhesive being disposed externally of said shim, and a first closeout laminate extending around the periphery of the composite sandwich, said first closeout laminate being exterior to the outer layer of cured foaming adhesive and being wrapped around the honeycomb core, wherein said honeycomb core composite panel is light weight and has high strength.

2. The honeycomb core composite panel as recited in claim 1 wherein said shim is of composite material.

3. The honeycomb core composite panel as recited in claim 1 wherein said composite shim has a height substantially equaling the height of said honeycomb.

4. The honeycomb core composite panel as recited in claim 1 wherein said first closeout laminate is interior to the upper and lower composite panels.

5. The honeycomb core composite panel as recited in claim 4 wherein a second closeout laminate extends around the periphery of the composite sandwich and overlaps the upper and lower composite panels.

* * * * *